Aug. 18, 1931. W. E. WOODARD 1,819,856
LOCOMOTIVE DRIVING BOX AND BEARING THEREFOR
Filed Jan. 12, 1928
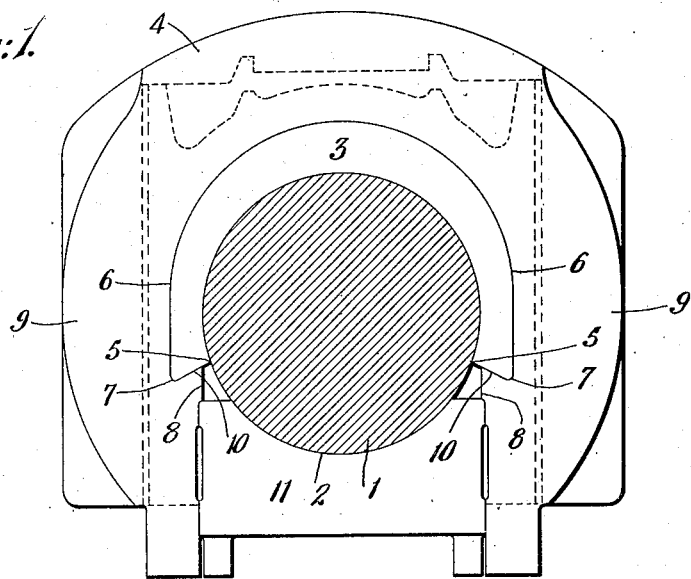
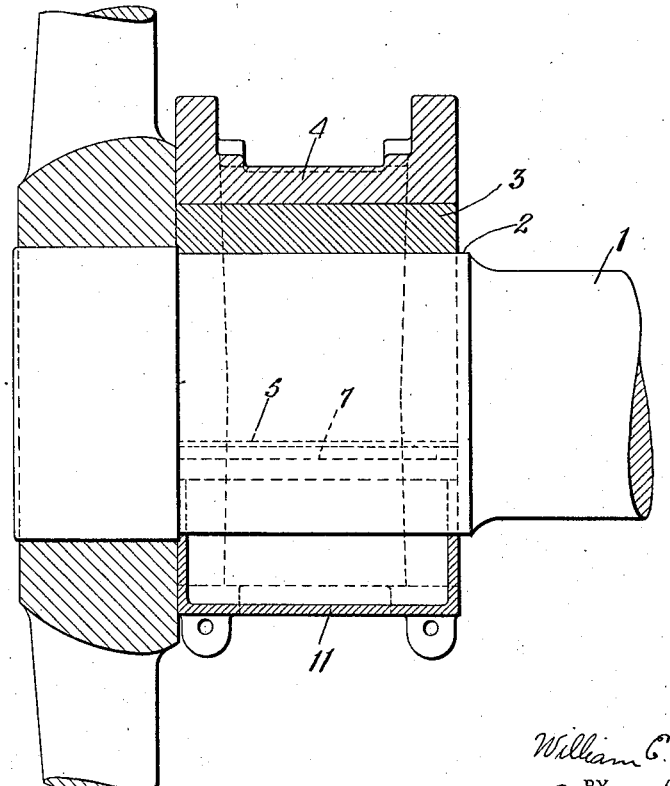
INVENTOR
William E. Woodard
BY
Synnestvedt & Lechner
ATTORNEYS Patented Aug. 18, 1931

1,819,856

UNITED STATES PATENT OFFICE

WILLIAM E. WOODARD, OF FOREST HILLS, NEW YORK

LOCOMOTIVE DRIVING BOX AND BEARING THEREFOR

Application filed January 12, 1928. Serial No. 246,106.

This invention relates to driving boxes for the journals of locomotive driving axles and is particularly useful in connection with integral yoke-shaped bearings which are adapted or constructed to engage the journal for a substantial distance below as well as above the horizontal center line of the journal. In other words the invention is especially useful where the bearing is arranged to engage or embrace a portion of the circumference of the journal which is materially greater than half so as to provide extended bearing areas at either side of the horizontal center line in order to withstand the heavy horizontal thrusts which are transmitted to the driving box by the locomotive crank pin.

In driving boxes where bearings of the foregoing type have been employed, it has been customary, insofar as I am aware, to bring in the legs of the yoke-shaped driving box a substantial distance over what is customary in order to provide adequate backing or support for the bearings. This, however, encroaches upon the space available for the lubricating cellar and makes it necessary to adopt a cellar which is less than the customary maximum for a given size journal.

Among the principal objects of my invention is the provision of a construction by which the foregoing difficulties are overcome and, as will be seen, I provide a box and bearing structure which will permit of the use of a cellar of adequate capacity while at the same time providing an adequate backing or support for the bearing along the horizontal thrust line. It is also an object of the invention to provide a construction in which the bearing can be given an increased thickness at the sides, particularly below the horizontal center line of the journal where the greatest amount of distortion or flattening is liable to occur due to the horizontal thrust from the crank pin.

The invention is illustrated in its preferred form in the accompanying drawings, wherein Fig. 1 is a cross section thru the journal of a locomotive driving axle showing the box and bearing structure in elevation, and Fig. 2 is a longitudinal section thru one end of a locomotive driving axle showing a portion of the driving wheel as well as the bearing and box structure.

By referring to the drawings it will be seen that the central portion 1 of the axle is of less diameter than the journal 2 so that the bearing 3, when properly assembled in the box 4, may be passed around the axle at such reduced portion and then moved longitudinally of the axle into position over the journal 2. The bearing 3 is yoke-shaped and the distance between the two lower inner points 5, while less than the diameter of the journal, is greater than the diameter of the reduced portion 1. It will also be seen that the two outer sides 6 of the bearing are brought straight down from a point substantially in the horizontal center line of the journal or slightly thereabove to a point 7 slightly below the inner corners 5 as clearly shown in Fig. 1. In this way I give the sides of the bearing a substantial thickness at their lower ends below the horizontal center line of the journal. In fact the thickness of the sides of the bearing, both above and below the horizontal center line of the journal is greater than the thickness at the horizontal center line.

The inner surfaces 8 of the box legs 9 are spaced apart a distance which is preferably equal to the diameter of the journal or slightly greater. This would not be possible were the sides 6 of the bearing 3 curved inwardly to follow the general contour of the journal as has been the customary practice heretofore for the reason that this would bring the outer lower corners 7 of the bearing approximately opposite the edge of the surfaces 8 or at least so close thereto as to leave very little, if any, shoulder in the box at the outside of the bearing to act as a proper backing or support for the lower ends of the bearing.

With my improved construction, however, the box legs provide a substantial shoulder or pocket-like recess 10 for engaging and supporting the lower ends of the bearing.

Furthermore an additional advantage is made possible by the structure described, namely, the use of a cellar 11 of maximum width.

It will be seen that the structure provides a very adequate bearing surface for receiving the horizontal thrusts and that the bearing itself is firmly and adequately backed or supported by the box legs and further that thoroughness and reliability of lubrication is made possible by the large capacity lubricating cellar.

What I claim is:—

The combination of a locomotive driving axle having a journal and an adjacent portion of smaller diameter than the journal, a yoke-shaped driving box the legs of which are spaced sufficiently far apart to pass said journal, and a one-piece crown bearing in the box having sides which curve inwardly both above and below the horizontal center line of the journal to provide a substantial journal engaging portion adapted to receive horizontal thrusts but spaced sufficiently to pass said reduced portion, said bearing being of greater thickness both above and below than at said horizontal center line.

In testimony whereof I have hereunto signed my name.

WILLIAM E. WOODARD.